US012804224B2

(12) United States Patent
Toth et al.

(10) Patent No.: US 12,804,224 B2
(45) Date of Patent: Nov. 17, 2026

(54) SYSTEM AND METHOD FOR PRESERVING METADATA TIMING IN A VIDEO PROCESSING NODE

(71) Applicant: LTN Global Communications Inc., Columbia, MD (US)

(72) Inventors: Steven Toth, Stony Brook, NY (US); Kyle Cavin, Atlanta, GA (US)

(73) Assignee: LTN Global Communications Inc., Columbia, MD (US)

( * ) Notice: Subject to any disclaimer, the term of this patent is extended or adjusted under 35 U.S.C. 154(b) by 0 days.

(21) Appl. No.: 19/296,672

(22) Filed: Aug. 11, 2025

(65) Prior Publication Data

US 2026/0156319 A1 Jun. 4, 2026

Related U.S. Application Data

(60) Provisional application No. 63/728,107, filed on Dec. 4, 2024.

(51) Int. Cl.
*H04N 21/435* (2011.01)
*H04N 21/845* (2011.01)

(52) U.S. Cl.
CPC ..... *H04N 21/4351* (2013.01); *H04N 21/8455* (2013.01); *H04N 21/8456* (2013.01)

(58) Field of Classification Search
None
See application file for complete search history.

(56) References Cited

U.S. PATENT DOCUMENTS

2016/0295293 A1* 10/2016 McLaughlin .... H04N 21/44004
2024/0422408 A1* 12/2024 Nihei ................ H04N 21/8547

* cited by examiner

*Primary Examiner* — James R Marandi
(74) *Attorney, Agent, or Firm* — Robert Babayi; Vector IP Law Group

(57) ABSTRACT

A system and method preserve the temporal accuracy of metadata in a flow comprising multimedia frames by applying an original flow containing original metadata to a processing environment comprising one or more components that implement a multimedia workflow to produce a processed flow. The system and method retain the original metadata before applying the original Flow to the processing environment, without altering the original Flow. The system and method generate original correlation data comprising original timing information and frame-specific fingerprints associated with the original Flow. The system and method also generate processed correlation data comprising processed timing information and frame-specific fingerprints associated with the processed Flow before determining a latency based on the original correlation data and the processed correlation data. The system and method reinsert the original flow metadata into the processed Flow based on the determined Latency.

20 Claims, 10 Drawing Sheets

POINT A - ANALYSIS BLOCK - TIMING CONTEXT

| UNIQUE TIME CONTEXT # | LTN SEI TIMING BLOCK | | | WALLTIME OBSERVED | | OTHER ATTACHED METADATA / PAYLOAD | STREAM CLOCKS | |
|---|---|---|---|---|---|---|---|---|
| | UNIQUE FRAME # | EPOC SECONDS | US | EPOC SECONDS | US | (DETAILS REDACTED) | PTS | PCR |
| 6 | 6 | 2025-05-12 14:14:08 | 100002 | 2025-05-12 14:17:21 | 333340 | SCTE35 PAYLOAD | 14500002 | 4350000600 |
| 7 | 7 | 2025-05-12 14:14:08 | 116669 | 2025-05-12 14:17:21 | 350007 | | 14516669 | 4355000700 |
| 8 | 8 | 2025-05-12 14:14:08 | 133336 | 2025-05-12 14:17:21 | 366674 | | 14533336 | 4360000800 |
| 9 | 9 | 2025-05-12 14:14:08 | 150003 | 2025-05-12 14:17:21 | 383341 | SMPTE2038 PAYLOAD | 14550003 | 4365000900 |
| 10 | 10 | 2025-05-12 14:14:08 | 166670 | 2025-05-12 14:17:21 | 400008 | SMPTE2038 PAYLOAD | 14566670 | 4370001000 |
| 11 | 11 | 2025-05-12 14:14:08 | 183337 | 2025-05-12 14:17:21 | 416675 | | 14583337 | 4375001100 |
| 12 | 12 | 2025-05-12 14:14:08 | 200004 | 2025-05-12 14:17:21 | 433342 | | 14600004 | 4380001200 |
| 13 | 13 | 2025-05-12 14:14:08 | 216671 | 2025-05-12 14:17:21 | 450009 | SCTE35 PAYLOAD | 14616671 | 4385001300 |
| 14 | 14 | 2025-05-12 14:14:08 | 233338 | 2025-05-12 14:17:21 | 466676 | | 14633338 | 4390001400 |
| 15 | 15 | 2025-05-12 14:14:08 | 250005 | 2025-05-12 14:17:21 | 483343 | | 14650005 | 4395001500 |

POINT B - ANALYSIS BLOCK - TIMING CONTEXT

| UNIQUE TIME CONTEXT # | LTN SEI TIMING BLOCK | | | WALLTIME OBSERVED | | OTHER ATTACHED METADATA / PAYLOAD | STREAM CLOCKS | |
|---|---|---|---|---|---|---|---|---|
| | UNIQUE FRAME # | EPOC SECONDS | US | EPOC SECONDS | US | (DETAILS REDACTED) | PTS | PCR |
| 471 | 2 | 2025-05-12 14:14:08 | 33334 | 2025-05-12 14:17:21 | 366672 | SCTE35 PAYLOAD, SMPTE2038 PAYLOAD | 693033334 | 207910000200 |
| 472 | 3 | 2025-05-12 14:14:08 | 50001 | 2025-05-12 14:17:21 | 383339 | SCTE35 PAYLOAD | 693050001 | 207915000300 |
| 473 | 4 | 2025-05-12 14:14:08 | 66668 | 2025-05-12 14:17:21 | 400006 | | 693066668 | 207920000400 |
| 474 | 5 | 2025-05-12 14:14:08 | 83335 | 2025-05-12 14:17:21 | 416673 | | 693083335 | 207925000500 |
| 475 | 6 | 2025-05-12 14:14:08 | 100002 | 2025-05-12 14:17:21 | 433340 | SCTE35 PAYLOAD | 693100002 | 207930000600 |
| 476 | 7 | 2025-05-12 14:14:08 | 116669 | 2025-05-12 14:17:21 | 450007 | | 693116669 | 207935000700 |
| 477 | 8 | 2025-05-12 14:14:08 | 133336 | 2025-05-12 14:17:21 | 466674 | | 693133336 | 207940000800 |
| 478 | 9 | 2025-05-12 14:14:08 | 150003 | 2025-05-12 14:17:21 | 483341 | SMPTE2038 PAYLOAD | 693150003 | 207945000900 |

FIG. 5

SYSTEM AND METHOD FOR PRESERVING METADATA TIMING IN A VIDEO PROCESSING NODE

PRIORITY CLAIM

This application claims priority to U.S. Provisional Application No. 63/728,107 filed on Dec. 4, 2024, which is hereby incorporated by reference in its entirety.

TECHNICAL FIELD

This invention relates to the real-time processing of multimedia content flows—video, audio, and metadata—particularly in distributed workflows where content is transformed, remixed, or prepared for delivery across varied platforms. The focus is on ensuring frame-accurate processing and preservation of metadata across such workflows.

BACKGROUND

Multimedia video flows, particularly live content, often undergo complex transformations—such as format conversion, editing, effects, ad insertion, transcoding, and packaging—across a distributed network of heterogeneous processing nodes. These nodes, provided by various vendors and platforms (e.g., broadcast, OTT, cloud), may modify both the content and its timing.

A core challenge in such workflows is the preservation of temporally synchronized metadata, which is critical for accurate ad triggers, captions, content blackouts, and regulatory compliance. As content is processed, this metadata can become desynchronized, corrupted, or lost due to operations like frame rate conversion, editing, or repackaging.

Most video processing systems are not built to recognize or preserve metadata, often leading to its loss, corruption, or removal during operations like transcoding (e.g., MPEG4 to HEVC) or aspect ratio adjustment. Since metadata formats are not always standardized—and may not even exist when processing systems are created—reliable preservation across transformations remains difficult.

Conventional systems attempt to maintain synchronization through embedded time codes or simple pass-through techniques. However, these methods are fragile, especially in multi-stage workflows, and fail when timecodes are altered or removed, or when the video processing system has removed them.

Crucially, existing solutions lack a frame-level tracking mechanism that can uniquely identify and trace video frames through complex transformations. Without this, it becomes challenging to re-associate metadata with its correct frame context.

Additionally, prior art fails to offer a reliable inter-node communication channel that persistently conveys original timing information independently of the transformed video. As a result, downstream components often operate with incomplete or incorrect temporal metadata, resulting in cumulative synchronization errors throughout the workflow.

Despite its importance, there is no clear standard in current video processing workflows for preserving metadata as video flows transform. Metadata is frequently lost or degraded, particularly in pipelines that involve multiple processing components from different vendors.

There is a critical unmet need for a system that can robustly preserve and recover the timing of metadata linked to specific video frames as they traverse distributed, heterogeneous processing environments. Such a system must enable reliable frame-level identification and communicate original metadata timing across transformation stages, overcoming the fragility of existing methods.

SUMMARY

Briefly, according to the present invention, a system and method preserve the temporal accuracy of metadata in a flow comprising multimedia frames by applying an original flow containing original metadata to a processing environment comprising one or more components that implement a multimedia workflow to produce a processed flow. The system and method of the invention retain he original metadata before applying the original Flow to the processing environment, without altering the original Flow. The system and method of the invention generate original correlation data comprising original timing information and frame-specific fingerprints associated with the original Flow. The system and method of the invention also generate processed correlation data comprising processed timing information and frame-specific fingerprints associated with the processed Flow before determining a latency based on the original correlation data and the processed correlation data. The system and method of the invention reinsert the original flow metadata into the processed Flow based on the determined Latency.

BRIEF DESCRIPTION OF THE DRAWINGS

FIG. 5 shows a Flow metadata table.

DETAILED DESCRIPTION

Figure 1:
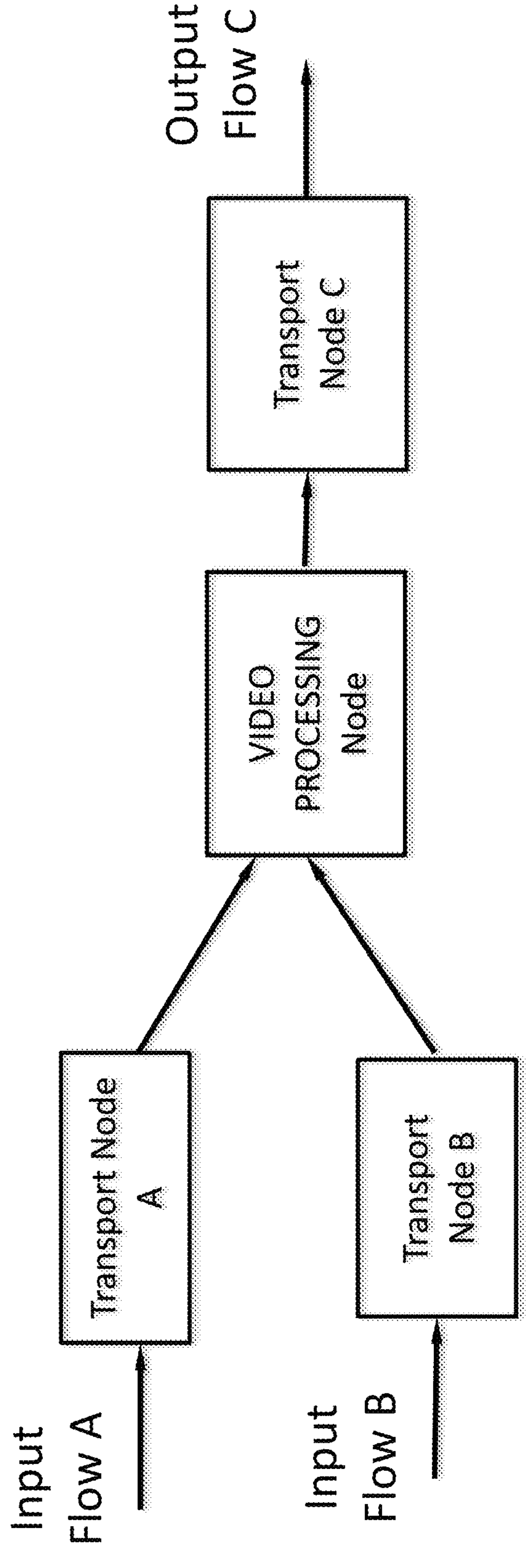
FIG. 1 a block diagram of a Video Processing Node (VPN).

In this specification, the following terms have the meaning ascribed to them herein:

Flow refers to a multimedia byte stream that may include video data, audio data, and Flow metadata. A flow may be stored on disk or received in real-time from an upstream node and may comprise multiple video, audio, and metadata tracks using different resolutions, frame rates, and codecs. Metadata within the Flow may be associated with specific video or audio frames, or both.

Frame refers to a discrete unit of video or audio data representing a specific moment in time within a Flow.

Processed Flow refers to a modified version of a Flow that has been processed by an unrelated technology or system. As a result, video and audio content of the Flow may be altered, and associated metadata with the Flow may be lost, corrupted, or degraded.

Transformed Flow refers to a modified version of Processed Flow that an Injector has further processed to support downstream processing.

Latency refers to the difference in arrival time of a given frame—or an equivalent frame—between a Flow and a corresponding Processed flow. Latency is typically measured as the temporal offset between the availability or rendering of the Frame in each version that results from encoding, transformation, buffering, transport, or other processing steps. Unless otherwise specified by context, Latency refers to the timing difference between Flow and Processed Flow.

Flow metadata refers to data other than audio or video payload that exists within FLOWS, such as SCTE35, SMPTE2038, ISO13818-private streams, customer-specific private data, or other standard and/or industry-standard related data sequences.

Correlation data refers to information used to identify, align, or compare corresponding Frames across different Flow states (e.g., Flow vs. Processed Flow), including Timing information and Fingerprints.

Fingerprint refers to a data signature that uniquely represents the content and/or timing of a specific Frame that can be used to identify, match, or correlate that Frame across different versions of a Flow. Fingerprints may comprise perceptual hashes, audio-based signatures, temporal sequence patterns, or hybrid combinations thereof, depending on the content and application. For example, a Fingerprint may be derived from luminance variance, audio frequency distribution, frame timing, or a fusion of pixel features and timestamp data. This multi-modal flexibility allows robust identification of Frames even when they undergo format transformation, compression, or re-encoding, enabling correlation across heterogeneous video processing systems.

Supplemental data refers to any data obtained from auxiliary sources and used by the Metadata transformer. Auxiliary sources include external systems, third-party services, configuration files, control signal sources, or orchestration platforms. Supplemental data may influence how Flow metadata is interpreted, transformed, or injected, and may include rule sets, policy directives, mapping tables, or context-specific triggers.

Server refers to a logical or physical computing resource capable of performing processing, storage, or communication tasks within a system. A server may host one or more software components, including but not limited to Metadata transformers, Flow inspectors, Injectors, or orchestration modules. Servers may operate locally, remotely, centrally, or in a distributed fashion, and may be implemented as dedicated hardware, virtual machines, or containerized services.

Component refers to a functional unit that performs one or more specific processing actions within the system. A Component may run on a Server, operate as a distinct software process, and include one or more processing Nodes arranged in serial, parallel, or hybrid configurations to execute tasks such as inspecting Flows, transforming Flow metadata, injecting information, or managing orchestration logic. Components may be modular and composable, enabling scalable and flexible deployment within distributed or cloud-based environments.

Node refers to a discrete processing unit that performs a specific function. A Node may carry out tasks such as receiving a Flow from a source, transmitting a Flow to a destination, executing an algorithm, or operating on Flow metadata or Correlation data. Nodes may be arranged in series or in parallel and may operate independently or in coordination with other Nodes.

Inspector (or Flow inspector) refers to a Component or Node that analyzes audio and/or video samples and timing data of a Flow to produce Correlation Data. The Inspector performs this analysis by retaining Flow Metadata without modifying or disrupting the Flow.

Inspector data refers to a collection of information obtained through the inspection and retention process performed by a Flow inspector. Inspector data may include one or both of Flow metadata and Correlation data and is gathered without altering or removing data from an original Flow.

Injector (or Flow injector) refers to a Component that modifies a Processed Flow by inserting, updating, or removing Flow Metadata based on provided instructions. The Injector may apply rule-based logic, external directives, or Supplemental data to annotate the Processed Flow with timing information, triggers, watermarks, or other metadata necessary for downstream processing.

Multimedia workflow refers to an arrangement of hardware, software, or computer systems organized into stages that collectively perform video processing and transformation operations, with each stage executing a specialized function. Servers may host one or more Components, which are physically or logically interconnected to form the Multimedia workflow.

Metadata transformation refers to the process of receiving a message containing Flow metadata created based on Inspector data, Correlation data, and Supplemental data, interpreting the message, applying new business rules to the Inspector metadata as needed, modifying the Inspector metadata as necessary, and generating new versions of the Inspector metadata.

Metadata transformer refers to a Component that performs Flow metadata transformation and/or generation based on Inspector data, Correlation data, and Supplemental data.

Video Processing System (VPS) refers to a Component or Workflow that may unintentionally corrupt, break, or otherwise remove Flow metadata. Such a system may not account for Flow metadata in its design.

Timing context refers to the point in time at which a Flow metadata, an audio or video Frame or sample is observed within a Flow at a particular stage in a Multimedia workflow determined based on Correlation data.

Frame accuracy refers to preserving the Flow metadata with sufficient temporal granularity to meet a required level of accuracy while balancing the computational cost of maintaining such temporal granularity. For example, Frame accuracy can be executed at the ideal granularity of individual frames, incurring a higher processing cost, compared to Frame accuracy at a lower granularity of several frames.

The terms "system," "platform," "device," "entity," "engine," and the like can refer to a computer entity or an entity related to an operational machine with one or more specific functionalities, such as encoder, transcoder, marker, or fingerprinting functionalities. The entities disclosed herein can be hardware, a combination of hardware and software, software, or software in execution. For example, a component may be, but is not limited to, a process running on a processor, an object, an executable, a thread of execution, a program, and/or a computer. By way of illustration, both an application running on a server and the server can be components. One or more components may reside within a process and/or thread of execution, and a component may be localized on one computer and/or distributed between two or more computers. Additionally, these components can be executed from various computer-readable media that store multiple data structures. The components may communicate via local and/or remote processes, such as through a signal comprising one or more data packets (e.g., data from one Component interacting with another element in a local system, distributed system, and/or across a network such as the Internet with other systems via the signal).

FIG. 1 shows a block diagram of a VPN that can be implemented by Components that accept multiple multimedia Flows containing video and audio content as well as Flow metadata. The VPN can be a hardware device or a set of software processes that subject Flows to an inter-node flow transformation workflow process implemented before providing Flows via respective transport blocks. As shown, Flow A is ingested at a transport Node A, and Flow B is ingested at a transport Node B. Nodes A and B can be implemented, for example, by an ingestion server to condition and normalize Flows A and B for further processing. Flows A and B are applied to a Video Processing Node (VPN), which implements a processing environment that subjects Flows A and B to a Multimedia workflow comprising a set of Components, conditions, and operations. The Flows travel through a transformative Multimedia workflow that can affect how content and metadata are handled, transformed, or timed. The output of the VPN is applied to Transport Node C, which provides a transformed Flow C.

The invention preserves the Flow metadata context, ensuring it remains frame-accurate and synchronized across transformations. Within the system of FIG. 1, contextualization involves identifying relevant attributes that match the Flow metadata in time with the Frames in the Flow to which it was initially associated. As further described below, the current invention can preserve the context of Flow metadata associated with Flows at various levels of Frame accuracy as the Flow metadata progresses through a pipeline that implements the Multimedia workflow. More specifically, Flow metadata remains accurately aligned with its corresponding Frame, even if the Multimedia workflow transforms the Frame content. For example, if a Flow metadata comprising a caption in a real-time Flow that is originally meant to appear 0.5 seconds after a player scores in a live broadcast gets delayed due to transcoding, the present invention detects the Latency. It adjusts the Flow metadata's timestamp so that it still appears at the correct moment even after the content has changed format or been rerouted. As a result, the Flow metadata remains contextually synchronized in time within the right Frame while respecting downstream timing expectations, formats, and business rules.

Figure 2:
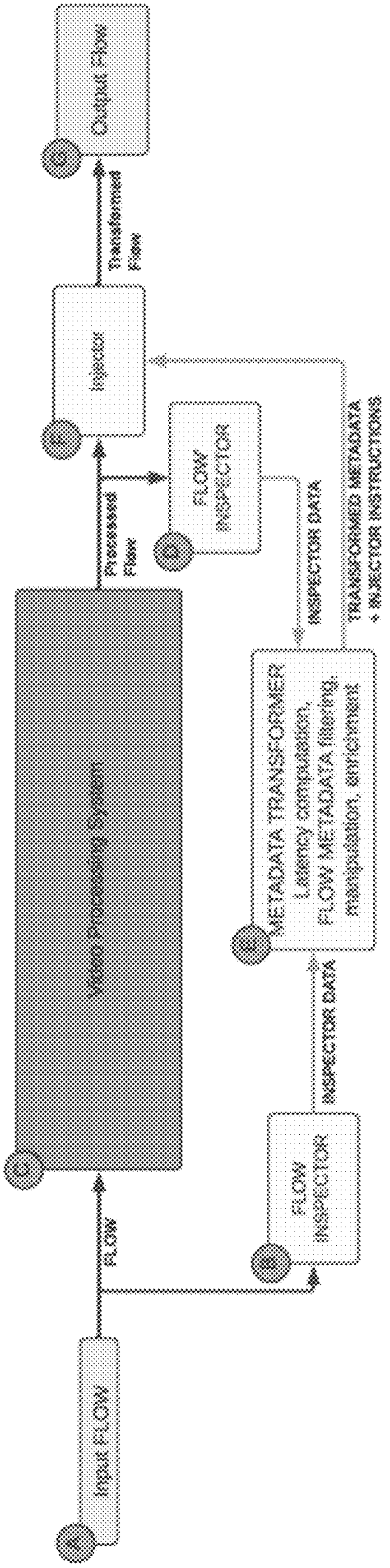
FIG. 2 shows a block diagram of one embodiment of the VPN of FIG. 1.

FIG. 2 shows a block diagram of one embodiment of the VPN in FIG. 1, which is used for processing real-time Flows while contextually preserving Flow metadata across distributed Components and Nodes. As shown, an ingested original Flow from a source (FLOW) initially containing video, audio, and Flow metadata is applied to a Video Processing System (VPS) within the VPN of FIG. 1. For example, the original Flow may initially include standard and non-standard Flow metadata types such as SCTE35, SMPTE 2038, and private data. The VPS is designed to implement a Multimedia workflow that performs frame-based operations on the original Flow before producing a Processed flow (FLOW'). In one embodiment, the VPS can support multiple operational modes, including, but not limited to, transcoding or converting video data from one format or resolution to another, mixing and compressing video and audio data, resizing, creating visual effects, grading, correcting color, or other operations. By subjecting the original Flow to the implemented processing of the Multimedia workflow, however, the VPS may unintentionally alter, strip, break up, corrupt, or misalign the Flow metadata.

Before the original Flow is changed in any way by the VPS, it is applied to an input Flow inspector, which runs processes and algorithms to analyze the original Flow. The input Flow inspector retains Flow metadata, such as SCTE-35 and SMPTE 2038, without modifying or disrupting the original Flow. The input Inspector extracts timing data associated with Frames, such as PTS, PCR, and wall clock, and computes Fingerprints unique to each Frame of the original Flow to provide the original Correlation data.

The input Flow inspector can sample video and/or audio frames and compute a digital video frame Fingerprint, which is generally unique to a Frame of pixels and/or audio samples. Fingerprinting or hashing is a dimension reduction process that identifies, extracts, and then summarizes characteristic components of audio or video, frame-by-frame, as a unique or a set of multiple perceptual hashes or fingerprints for each video or audio Frame. In essence, fingerprinting creates unique identifiers for individual Frames. The input Flow inspector processes a timestamp for each Fingerprint to provide corresponding temporal references. A video or audio Fingerprint can reference or address metadata in each inspected Flow. Examples of fingerprinting that can be used with the present invention are described in U.S. Pat. No. 10,390,109B2 and U.S. Pat. No. 11,122,344B2, both titled "System and Method For Synchronizing Metadata with Audiovisual Content", owned by LTN Global Inc., the assignee of the present invention, which are hereby incorporated by reference in their entireties. (The LTN Fingerprints). The original Flow inspector generates original Correlation data, which is used to identify, align, or compare corresponding Frames across different Flow states. Examples of Correlation data can include Fingerprints, Wall time, Presentation timestamps (PTS), Decode timestamps (DTS), Program Clock Reference (PCR), SEI timecode metadata, and Fingerprint arrival timestamps.

After the original Flow is changed by the VPS, the resulting Processed Flow is applied to an output Flow inspector. The output Flow inspector runs processes that are identical to the input Inspector process on the Processed Flow to extract what remains of the Flow metadata. The output Flow inspector extracts processed timing information and computes processed Fingerprints unique to each processed Frame to provide output Correlation data, which is used for correlation with the original Correlation data.

A Metadata transformer receives the original Correlation data from the original Flow inspector and the output Correlation data from the output Inspector to measure Latency, i.e., the timing difference between the original Flow and Processed Flow introduced by the processes of the Multimedia workflow implemented by the VPS. The Metadata transformer obtains Flow metadata from the input Inspector data and measures Latency based on the timing information obtained from the original and processed Correlation data. The Metadata transformer can also create Flow metadata based on business rules applied to the original Flow metadata contained in the original Flow. Examples include changing an SCTE 35 pre-roll, changing the PTS timing of SMPTE 2038 messages, or driving a graphics overlay within the VPS. The Metadata transformer provides transformed, timing-adjusted Flow Metadata and generates instructions on how and where to insert the transformed metadata into the processed Flow. In one embodiment, multiple Metadata transformers can be used for transforming multiple Flow metadata. The Latency calculations can be performed separately from each other. In one embodiment, one metadata transformer can be an SCTE 224 Component that defines an ESNI for communicating event and policy information. This Component can interpret an SCTE 35 Flow, which signals the insertion of advertisements, program segments, or other events within the Flow.

A Flow injector uses instructions from the Metadata transformer to add the Flow metadata back into the Processed Flow with timing information (e.g., wall time, PTS) that the characteristic of the Latency has adjusted. The Injector produces a Transformed (FLOW") that has the video and audio from the Processed flow, but with transformed Flow metadata reinserted in the correct places and at the correct times for further downstream processing. As a result of this adjustment, the VPN of FIG. 1 permits the preservation of the original Timing context of the original Flow metadata when any Latency-based adjustment is reinjected into Processed (FLOW') to create the Transformed flow (FLOW") by the Injector.

Figure 3:
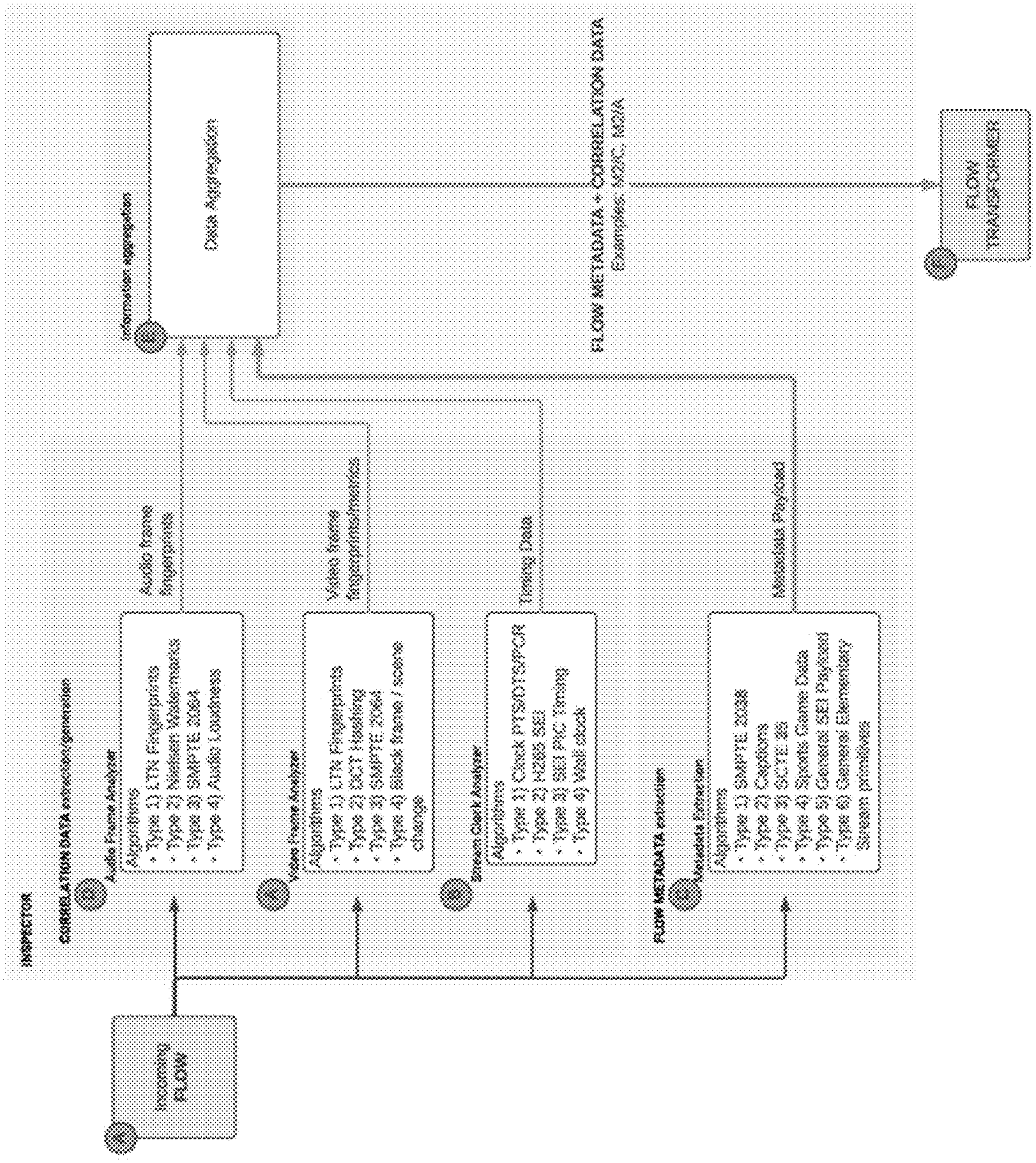
FIG. 3 shows a block diagram of a Flow inspector.

FIG. 3 shows a block diagram of the Flow inspector used for Correlation data generation. The Flow inspector runs multiple simultaneous algorithms on the original Flow to determine Correlation data, comprising accurate audio, video, metadata, and timing information, frame-by-frame, and computes digital Fingerprints unique to each Frame.

After receiving the original Flow at the Flow inspector, an audio frame analyzer logic produces audio frame Fingerprints, including LTN Fingerprints. Each audio frame contains various types of information, including Nielsen watermarks, SMPTE 2064, and audio loudness used to compute audio frame Fingerprints.

A video frame analyzer logic produces video frame metrics that correspond to Fingerprints, including LTN Fingerprints. Each video frame contains various types of information, including SMPTE 2064 and Discrete Cosine Transform (DCT) Hashing, as Well as Black frame I scene changes used to compute video frame Fingerprints. A stream clock analyzer logic produces timing data, including Clock, PTS, DTS and PCR timing Data, H265 SEI', SEI PIC Timing, and Wall clock.

A flow metadata extraction logic continuously extracts original Flow metadata found in the original Flow to provide a Flow metadata payload that includes: SMPTE 2038, Captions, SCTE 35, Sports Game Data, General SEI Payload, and General Elementary Stream primitives.

A data aggregation block receives the audio frame Fingerprints, video frame Fingerprints, timing data, and Flow metadata payload. The data aggregation block continuously produces Correlation data that associates the timing information with timestamped Fingerprints for accurate Time context. The Flow Inspector assembles Flow metadata, along with Correlation data, into Flow Inspector data, which is then provided to a Metadata transformer.

Below are examples of any Flow metadata, including (non-video or non-audio Flow metadata, retained by the original Flow inspector, which associates them with accurate Timing Context, including those categorized below as: 1) Video or Audio related, 2) SCTE35, 3) SMPTE 2038, and 4) OTHER METADATA/UNDEFINED.

Video or Audio Related:
- EPOC timestamp for each Transport Packet received
- NIC provided hardware timestamps for each Transport Packet received from the network.
- PCR timestamp if available, within the Transport packet
- PCR timestamp is synthesized if no PCR is present in the packet
- Probe processing latency measured in microseconds, from the time of first transport packet arrival to the moment final processing was complete, intending to measure exact inspector latency.
- PTS, if available
- DTS, if available
- LTN proprietary fingerprint hashes, if applicable
- SMPTE2064 fingerprints, if available
- LTN proprietary SEI timecode, if available
- Unique incrementing frame number.
- EPOCH times when the Frame entered and left the LTN Encoder module.
- DCT hashes, if available
- Closed Captions, if available
- SEI PIC TIMING messages, if available
- PMT table
- Full original message
- Decomposed PAT/PMT structure in JSON format.

SCTE35
- EPOC timestamp for each Transport Packet received
- NIC provided hardware timestamps for each Transport Packet received from the network.
- PCR timestamp if available, within the Transport packet
- PCR timestamp is synthesized if no PCR is present in the packet
- Splice point PTS.
- Time inferred value, number of seconds from walltime to the splice point.
- PTS Adjustment values
- Payload
- Full original SCTE35 message
- Decomposed SCTE35 message in JSON format.

Figure 4:
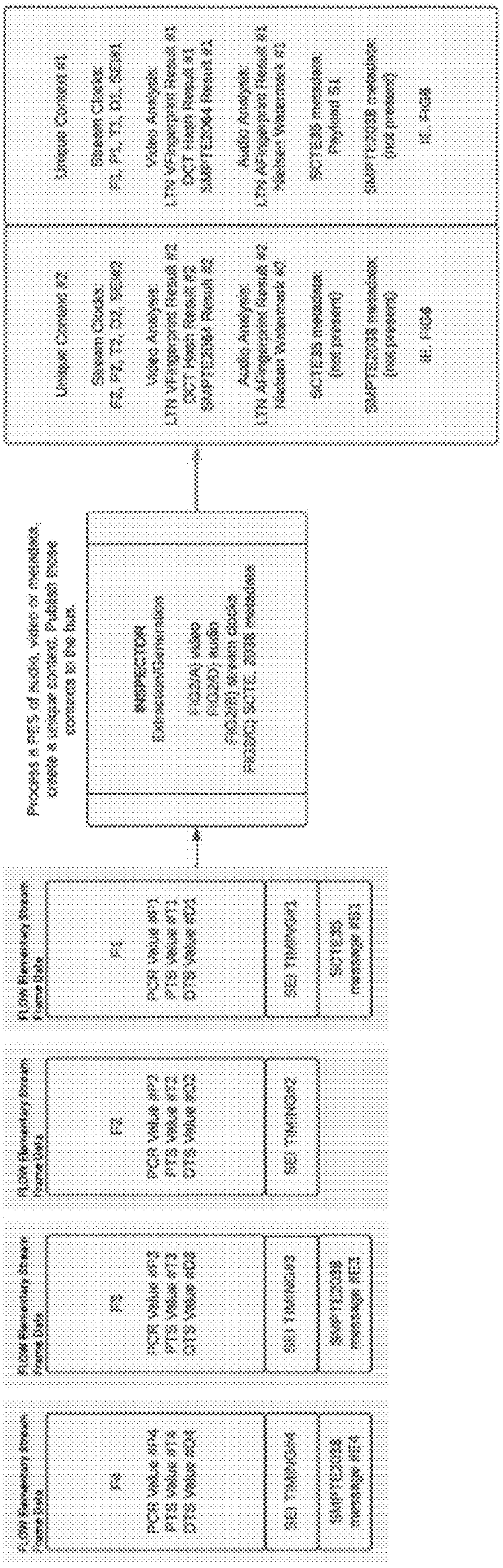
FIG. 4 shows the Timing contexts of Frames processed by the Flow inspector.

SMPTE 2038
- EPOC timestamp for each Transport Packet received
- NIC provided a hardware timestamp for each Transport Packet received from the network.
- PCR timestamp, if available, within the Transport packet
- PCR timestamp is synthesized if no PCR is present in the packet
- PTS, if available
- DTS, if available.
- Payload
- Full original SMPTE 2038 message
- Decomposed SMPTE 2038 message in XML format/ SMPTE 291 format Other Metadata/Undefined
- EPOC timestamp for each Transport Packet received
- NIC provided a hardware timestamp for each Transport Packet received from the network.
- PCR timestamp, if available, within the Transport packet
- PCR timestamp is synthesized if no PCR is present in the packet
- PTS, if available
- DTS, if available FIG. 4 shows how the Flow inspector puts attributes from Frames into unique Timing contexts. As shown, a Flow of video Frames 1, 2, 3, and 4 is applied serially to the Flow inspector, each containing the corresponding PCR Value, PTS Value, and DTS Value. Each Frame also includes SEI TIMING and SMPTE 2038 information. The Flow inspector implements the audio frame analyzer logic, video frame analyzer logic, stream clock analyzer logic, and the Flow metadata retention logic shown in FIG. 3. The Flow inspector runs algorithms to extract video, audio, stream timing or Flow metadata a Flow frame-by-frame, to produce a series of unique contexts for each Frame, including Timing context, (Stream Clocks), Video analysis context (LTN VFingerprint Result, DCT Hash Result, SMPTE2064 Result), Audio analysis context (LTN AFingerprint Result, Nielsen Watermark Result), as well as SCTE35 metadata, SMPTE 2038 metadata and Payload selection contexts.

In one embodiment, the process correlates frames from the original flow with frames from the processed flow on an ongoing basis, even in the absence of flow metadata, to maintain the correlation and provide sampling of fingerprinting data for latency determination.

Maintaining correlation between original Flow and Processed Flow is essential for preserving Flow metadata context within the VPN of FIG. 1. Such correlation associates unique Fingerprints derived from a Frame's visual or audio content with Timing information, such as a presentation timestamp (PTS), decode timestamp (DTS), or Wall-clock time (T). This correlation enables the identification of semantically equivalent Frames across differently encoded or processed versions of an original Flow. By maintaining a synchronized pairing of the Correlation data at the input and output of the VPS, the VPN can accurately determine frame-level Latency and ensure precise reinjection of Flow metadata, even in the presence of format conversion, timing drift, or non-deterministic processing delays. Indeed, the VPN can match a frame before and after video processing, even if the timestamps or encoding formats change. This enables the Metadata transformer to calculate Latency and determine exact reinsertion points for Flow metadata. Consequently, Fingerprints are used in tandem with timing information (e.g., PTS, DTS, Wall time) to uniquely identify Frames across original Flow (FLOW) and the Processed flow (FLOW'), enabling latency-aware reinjection of Flow metadata with frame-accurate precision.

FIG. 5 shows a Flow metadata table for each processing block. As shown, original Flow metadata is received from the original Flow inspector (POINT A), and processed metadata is received from the output Flow inspector (POINT B). Each row in the table represents cached metadata, indicating that a transformation has occurred within the VPN. As a result, the stream clocks, PTS, and PCR have been recreated for each unique timing context between the original and output Flow inspectors, but Flow metadata has been preserved.

Figure 6:
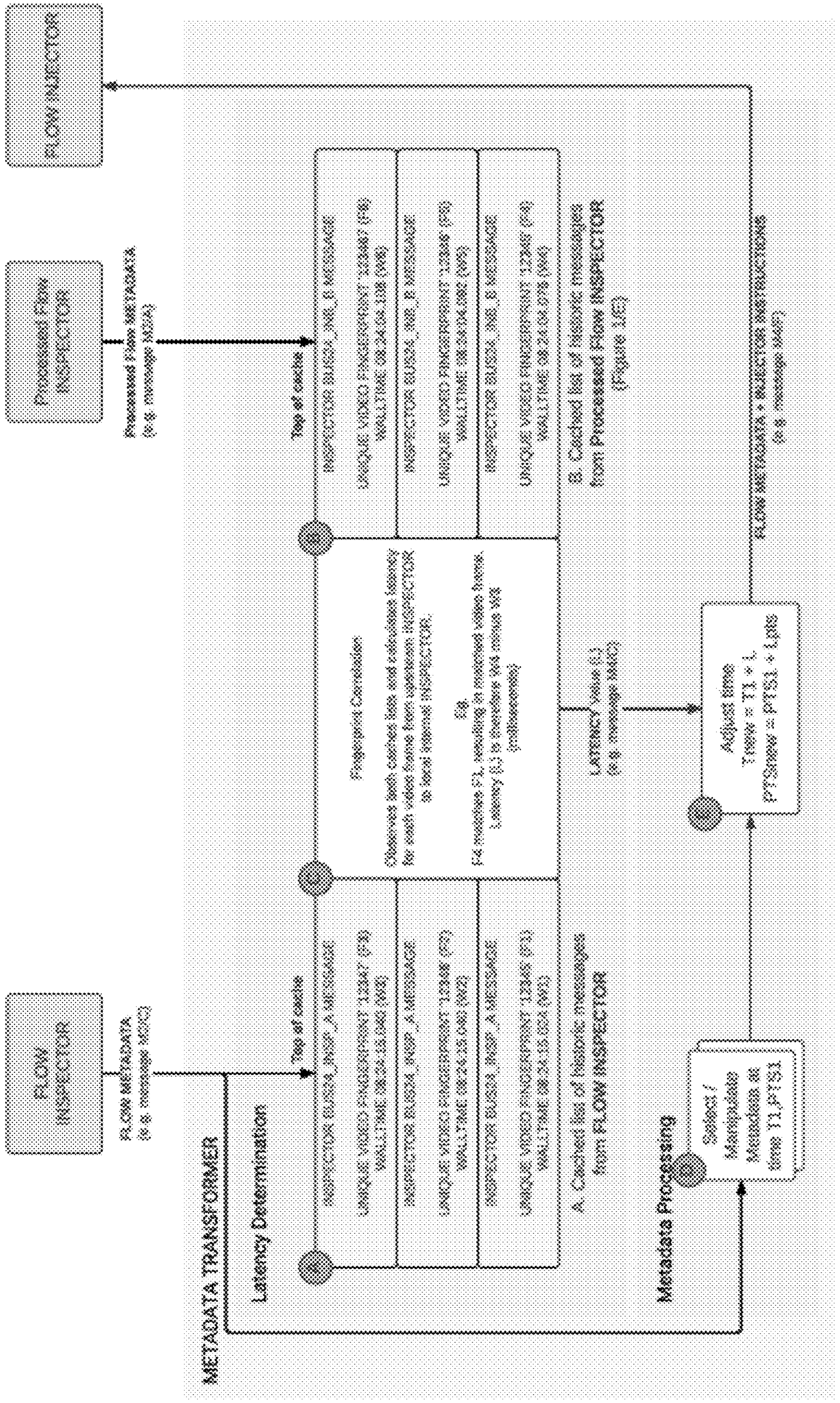
FIG. 6 shows a block diagram of a Metadata transformer.

FIG. 6 shows functional blocks of the Metadata transformer that include Latency determination and Metadata processing. During Latency determination, the Metadata transformer continuously caches Correlation data from the original Flow inspector and processed Flow inspector for a period that exceeds the maximum anticipated Latency. Based on the cached data, the Metadata transformer executes a Fingerprint correlation algorithm that looks for matched Fingerprints by observing cache lists of original Correlation data and processed Correlation data. For matched Fingerprints, the Fingerprint correlation algorithm subtracts the original timing information from the processed timing information to determine Latency. The Fingerprint correlation algorithm determines Latency based on Correlation data received from both the input and output Flow inspectors. The Metadata transformer continuously performs Fingerprint correlation to compute an accurate Latency measurement for each Frame of the Processed Flow.

During metadata processing, the Metadata transformer selects a Flow's metadata and its associated timing information. The metadata processing adjusts the Flow metadata timing information based on the measured Latency during the Latency determination process. During Latency determination in the example described below, the Metadata transformer caches the input and processed Correlation data received from the input and output Flow inspectors in two cache lists, as shown below:

| Cached original Correlation Data | Cached Processed Correlation Data |
|---|---|
| UNIQUE VIDEO FINGERPRINT '12347' (F3) WALL TIME 08:24:15.040 (W3) | UNIQUE VIDEO FINGERPRINT '123467 (F6) WALL TIME 08:24:04.108 (W6) |
| UNIQUE VIDEO FINGERPRINT '12346' (F2) WALL TIME 08:24:15.040 (W2) | UNIQUE VIDEO FINGERPRINT '12346' (FS) WALL TIME 08:24:04.092 (W5) |
| UNIQUE VIDEO FINGERPRINT '12345' (F1)] WALL TIME 08:24:15.024 (W1) | UNIQUE VIDEO FINGERPRINT '12345' (F4) WALL TIME 08:24:04.076 (W4) |

Based on the cache lists, the Latency determination process determines that F4 matches F1, resulting in a matched video frame, where Latency (L) is W4 minus W1 (milliseconds). During Flow metadata processing, the Metadata transformer selects Flow metadata at time T1, PTS1, and calculates adjusted time Tnew=T1+L and PTSnew PTS1+Lpts. The Metadata transformer then transmits the Flow metadata with a transformer instruction that instructs the Flow injector to adjust the timing information in the transmitted Flow metadata to Tnew=T1+L and PTSnew=PTS1+Lpts.

Figure 7:
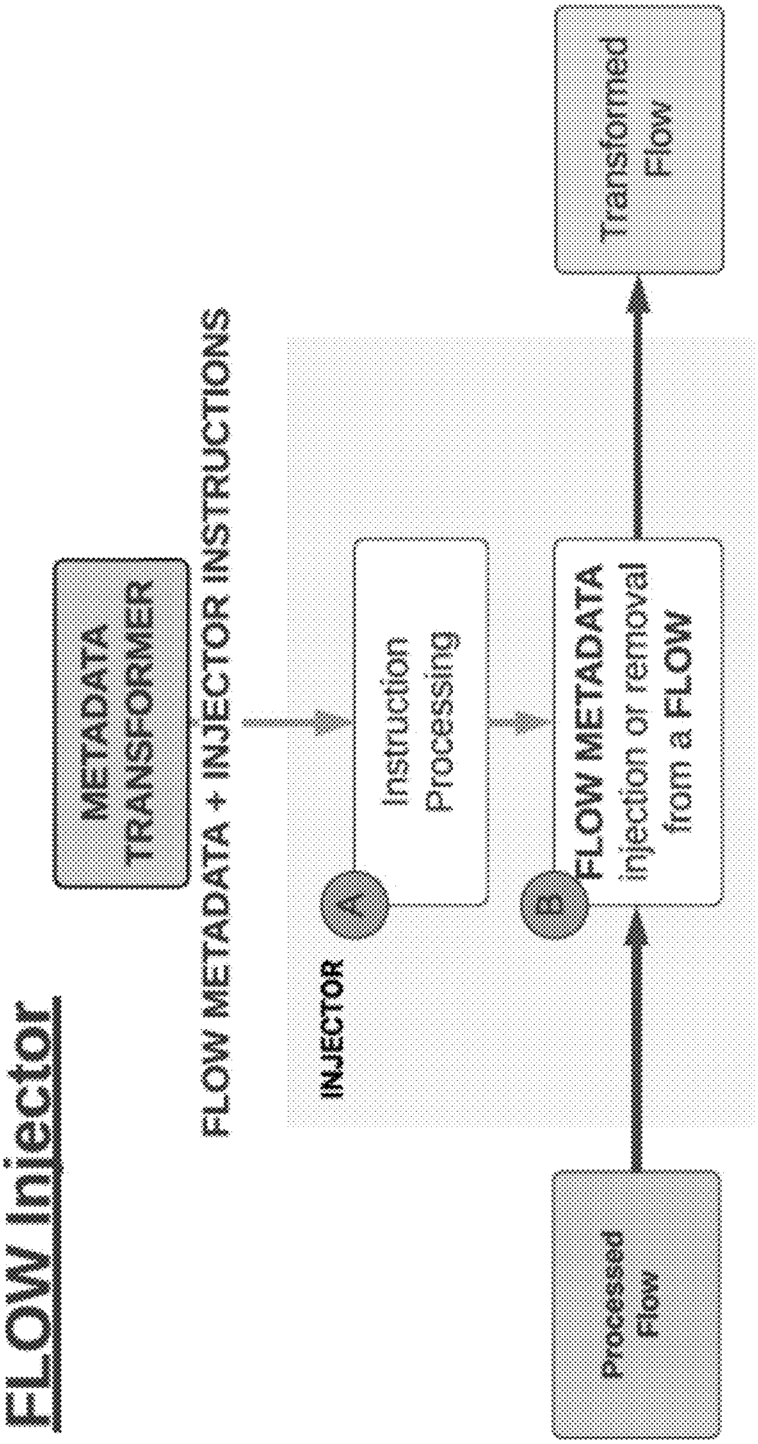
FIG. 7 shows a block diagram of a Flow injector.

FIG. 7 shows a block diagram of a Flow injector that receives the transformed Flow metadata and Metadata transformer instructions for processing, including instructions to act on the Flow, including adding or removing Flow metadata. Based on such instructions, for example, the Flow injector can serialize Flow metadata, such as translating a Wall time provided as an injection time into PTS. Such injection time can be written to the binary payload of the Flow metadata as the PTS value. A specific injection point or position in the Processed (FLOW) can also be based on Epoch time, Wall time, or other absolute timing values. For example, in one embodiment, the pre-poll of the SCTE35 Flow metadata may be adjusted or increased by Transformer instructions to the Flow injector, providing advanced notice to downstream systems of a splice point.

Figure 8:
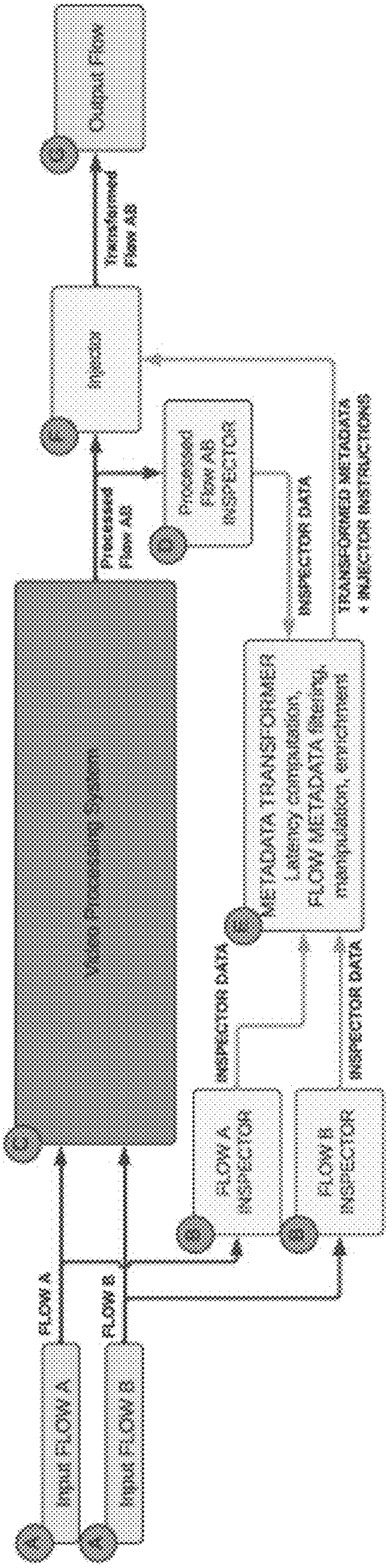
FIG. 8 shows a VPN, which employs multiple original Flows.

FIG. 8 shows a VPN, which employs multiple original Flows, FLOW A and FLOW B, to produce a single Transformed flow (FLOW AB"). In this embodiment, the Latency is calculated for FLOW A, which is used for reinjecting FLOW A and FLOW B metadata into Processed Flow (FLOW') to provide Transformed Flow (FLOW AB"). An example use-case of such an invention would be where FLOW A could provide SCTE 35 Flow metadata, while FLOW B would provide captions to be reinserted accurately in FLOW AB". In a multi-camera sports broadcast, Flow metadata (e.g., commercial triggers) from Flow originated one camera can be applied to Flow originated from another camera. For example, the present invention can synchronize Flow metadata like commercial break triggers across two video flows originating from two cameras capturing a game from different angles, ensuring consistent Flow metadata insertion regardless of camera perspective. Another example preserves closed caption or sports game data present on flow A, when the VPS switches to flow B to select a different video signal.

Figure 9:
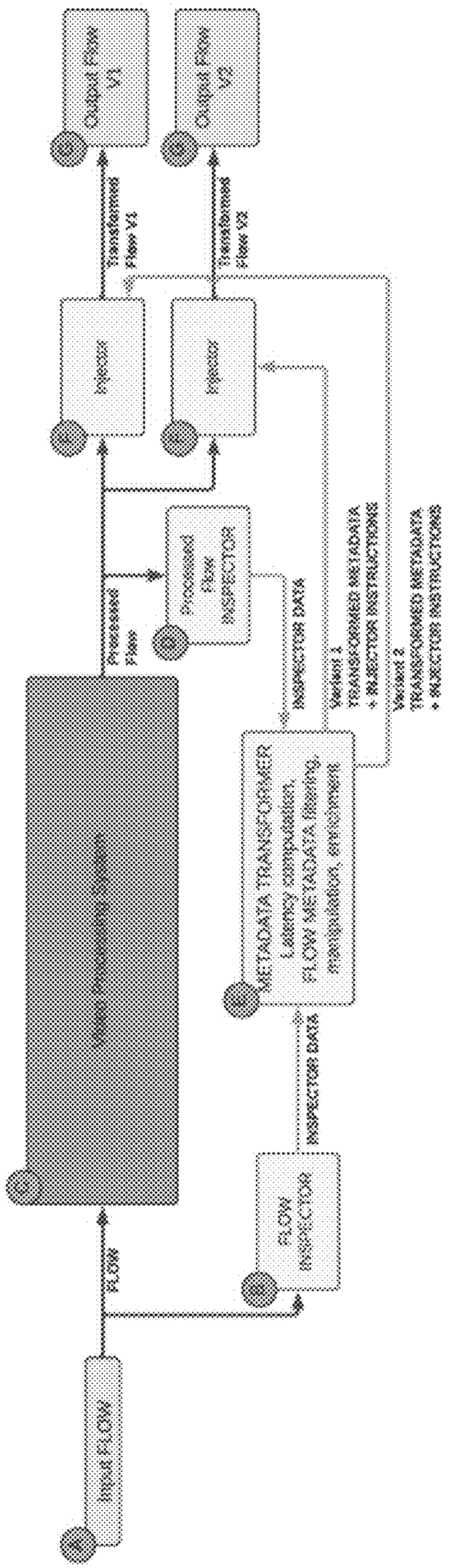
FIG. 9 shows a VPN that employs multiple Injectors.

FIG. 9 shows a VPN, which employs multiple Injectors to provide multiple variants of Transformed flows (FLOW" V1, FLOW" V2). These Transformed flows can each carry different Flow metadata, for example, according to differing business requirements, but the same audio and video Flows. For example, in a multilingual content delivery situation, the same video Flow can be converted into multiple language versions by injecting language-specific graphics or score information, thereby maintaining Flow metadata integrity while adapting content for different markets. In one use case, Flow can be transformed to carry English-language Flow metadata on one Transformed flow and carry Spanish-language Flow metadata on another Transformed flow. Another example, places different SCTE triggers into FLOW" V1 vs FLOW" V2, to enable simpler integration/consumption by downstream advertisement platforms.

Figure 10:
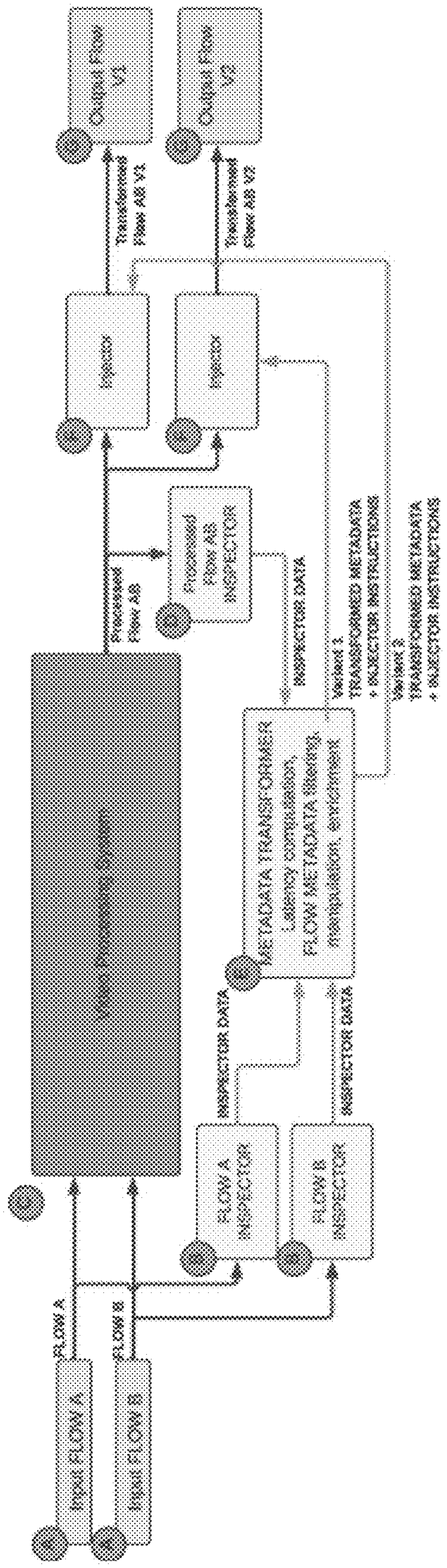
FIG. 10 shows a VPN, which employs multiple original Flows and multiple Injectors.

FIG. 10 shows a VPN that uses multiple original Flows and Injectors to generate several Transformed flows. In this setup, multiple original Flows can be processed and branched into various customized Transformed flows. More original and transformed flows can be added to suit specific use cases. One example of this setup, shown in FIG. 10, can be used during sporting events. For instance, FLOW A might originate from a video source recording a hockey game. FLOW B might come from a studio camera capturing the commentator's content about the game. The final broadcast flow combines game footage and commentator content, containing Flow metadata, as different downstream broadcasters, A and B, may each require a modified version of the Processed flows, V1 or V2. Broadcaster A may be licensed to broadcast the game's audio and video from Flow V1 but not the sport Flow metadata (such as player locations or who controls the puck). In contrast, Broadcaster B can be licensed to broadcast the game's audio, video, and sport Flow metadata. In such a setup, the Metadata transformer can provide different instructions to injectors, resulting in sport metadata being inserted into V2 but not into V1.

The VPN can be configured to insert Flow metadata into the Processed flow Frame accurately as a tunable operational parameter that reflects the precision required by a given application. The VPN supports multi-level accuracy optimization, enabling trade-offs between computational cost and precision. For example, highly frame-accurate Flow metadata alignment may be needed for watermarking or ad targeting within a single-frame boundary. However, lower accuracy tolerances may be acceptable where Frame drift of a few milliseconds does not significantly impact the viewer's experience. If the required level of accuracy is "very accurate," then the Flow metadata in that context is preserved by allocating more processing power than if the required level is "not so accurate." Thus, the present invention can be configured to apply various accuracy levels to metadata preservation according to the application's needs. This dynamic selection mechanism ensures that the most resource-efficient and thus cost-efficient Flow metadata handling method is employed based on the context-specific accuracy requirement.

The VPN can employ a common bus platform that implements an Inter-Process Communication (IPC) protocol (the IPS platform), which can convey messages between various Nodes and Components as well as processes that implement the present invention, including the Flow inspectors, the Metadata transformer, and the Flow injector. For example, the Flow inspectors can place formatted messages on the IPC platform, conveying Inspector data, which becomes available to the Metadata transformer. FIG. 6 shows the original Flow inspector uses a unique message name on the IPS platform, i.e., BUS24_INSP_A, that is distinct from one used by the output Inspector, i.e., BUS_24_INSP_B. Similarly, the Metadata transformer can place instruction messages on the IPC platform, which becomes available to the Injector. Examples of implementation of the IPC platform brokers include Apache Kafka, RabbitMQ, AWS SNS/SQS, or Mosquito. Using the IPC platform, a distributed video processing system can be implemented that processes Flows across geographically diverse data centers, while maintaining Flow metadata correlation across different processing sites.

As described above, the present invention covers a system and method that processes, for example by transcoding, an original Flow containing Flow metadata within its Frames to produce a processed Flow. The processing strips or alters the Flow metadata contextually. Before processing the original Flow, however, the system and method of the invention retain Flow metadata without modifying the original Flow. The system and method of the invention also obtain original Correlation data that includes timing information and frame-specific Fingerprints that are associated with the original Flow. After processing the original Flow, the system and method of the invention produce processed Correlation data that includes timing information and frame-specific Fingerprints that are associated with the processed Flow. The system and method of the present invention determine latency based on the original and processed Correlation data before inserting the retained Flow metadata into the processed Flow, based on the Latency, to produce a Transformed flow that preserves the Flow metadata in a contextually synchronized manner after the original Flow is processed.

As a result, the present invention can preserve Flow metadata semantics and timing through destructive video processing dynamically by balancing processing resources with Frame-accuracy. In this way, the present invention creates an adaptive system that can track and compensate for processing latencies without requiring pre-established timing parameters. The invention can handle multiple original Flows and produce different versions of Transformed flows. As a result, the invention provides flexibility to handle various scenarios, including multi-camera video streams, language-specific metadata, and business-specific metadata requirements.

The present invention provides a robust, extensible framework for preserving, tracking, and adapting Flow metadata in real-time video processing systems. By decoupling the metadata handling from the constraints of video format standards and enabling frame-accurate metadata placement even in the presence of Latency and distributed processing, the invention opens the door to customizable, resilient video and modular workflows.

The invention claimed is:

1. A method for preserving temporal accuracy of metadata in a flow comprising multimedia frames, the method comprising:

applying an original flow containing original metadata to a processing environment comprising one or more components that implement a multimedia workflow to produce a processed flow;

retaining the original metadata before applying the original Flow to the processing environment, without altering the original Flow;

generating original correlation data comprising original timing information and frame-specific fingerprints associated with the original Flow;

generating processed correlation data comprising processed timing information and frame-specific fingerprints associated with the processed Flow;

determining a latency based on the original correlation data and the processed correlation data; and reinserting the original flow metadata into the processed Flow based on the determined Latency.

2. The method of claim 1, wherein reinserting the original metadata comprises generating a message that includes the determined Latency, and transmitting the message to an injector component that inserts the original metadata into the processed Flow based on the message.

3. The method of claim 1, wherein determining the Latency comprises correlating the original frame-specific fingerprints with the processed frame-specific fingerprints and comparing the corresponding original and processed timing information.

4. The method of claim 1, wherein the original metadata comprises at least one of SCTE-35 messages, SMPTE 2038 messages, closed captions, SEI timecode metadata, or audio watermark information.

5. The method of claim 1, wherein the frame-specific fingerprints comprise one or more of perceptual video hashes, audio perceptual hashes, Discrete Cosine Transform (DCT) hashes, or SMPTE2064 hashes.

6. The method of claim 1, further comprising adjusting one or more timing fields of the original metadata based on the determined Latency prior to reinserting the metadata into the processed Flow.

7. The method of claim 1, wherein the correlation data is transmitted between components using a message bus implementing an inter-process communication (IPC) protocol.

8. The method of claim 1, wherein the Latency is determined on a per-frame basis to enable frame-accurate reinsertion of metadata into the processed Flow.

9. The method of claim 1, wherein reinserting the original metadata into the processed Flow is performed with a tunable level of frame accuracy based on a context-specific accuracy requirement.

10. The method of claim 9, wherein the context-specific accuracy requirement is determined based on one or more of:

(a) type of Flow metadata, (b) a business rule associated with the metadata, or (c) available processing resources.

11. The method of claim 1, wherein frame accuracy is implemented by aligning metadata reinsertion within a specified frame boundary tolerance, and wherein the tolerance is adjusted dynamically to optimize processing cost.

12. The method of claim 1, wherein a level of frame accuracy is selected from a plurality of predefined granularity options, including frame-level, group-of-frames level, and time-window level.

13. The method of claim 1, wherein the original flow comprises a plurality of original flows received from distinct sources, each comprising video, audio, and associated metadata.

14. The method of claim 13, wherein the latency is determined separately for each original flow and used to adjust metadata timing prior to reinsertion into a combined processed flow.

15. The method of claim 13, wherein the metadata comprises at least one of SCTE-35 messages from a first original flow and caption data from a second original flow, both reinjected into a common processed flow.

16. The method of claim 1, further comprising applying a plurality of metadata injectors to insert different versions of metadata into different processed flows.

17. The method of claim 1, wherein each metadata injector is configured to apply a transformation rule based on a specific business requirement, language setting, or geographic region.

18. The method of claim 17, wherein the processed Flow is branched into a plurality of transformed flows, each carrying the same video content but with different reinjected metadata versions.

19. The method of claim 17, wherein each metadata injector receives instructions from a metadata transformer identifying a target accuracy level and metadata version for reinsertion.

20. A system for generating processed flows from one or more original flows each comprising a corresponding original flow metadata comprising:

one or more input flow inspectors, each configured to obtain (or retain) the original metadata and generate original correlation data from a respective original flow;

a video processing system configured to process one or more original flows into corresponding one or more processed flows;

one or more output flow inspectors, each configured to generate processed correlation data from respective processed flows;

a metadata transformer configured to generate a latency based on an original correlation data and a processed correlation data; and a metadata injectors configured to insert the original metadata into the processed flows based on the Latency.

* * * * *